United States Patent [19]

Moser

[11] 3,889,321

[45] June 17, 1975

[54] TIE DOWN BRACKETS FOR SECURING BIGHTS OF FLEXIBLE MEMBERS

[76] Inventor: Willard W. Moser, Box 1503, Guymon, Okla. 73942

[22] Filed: Jan. 7, 1974

[21] Appl. No.: 431,205

[52] U.S. Cl. .................. 24/146; 24/147; 24/236; 24/115 K
[51] Int. Cl. ...... A43c 3/0; B21d 53/46; A44b 13/02
[58] Field of Search .......... 24/115 K, 146, 147, 144, 24/236; 280/179 A

[56] References Cited
UNITED STATES PATENTS

| | | | |
|---|---|---|---|
| 498,562 | 5/1893 | Milbrath | 24/236 |
| 513,652 | 1/1894 | Reed | 24/236 |
| 652,668 | 6/1900 | Dobbs | 24/236 |
| 880,251 | 2/1908 | Stimpson | 24/146 |
| 932,416 | 8/1909 | Snell | 24/233 |
| 962,326 | 6/1910 | Engstrom | 24/147 |
| 1,395,102 | 10/1921 | Gehrke | 24/236 |
| 3,026,591 | 3/1962 | Brock | 24/233 |

FOREIGN PATENTS OR APPLICATIONS 65,527   11/1892   Germany .......................... 24/236

*Primary Examiner*—Bernard A. Gelak
*Attorney, Agent, or Firm*—William R. Laney

[57] ABSTRACT

A tie down bracket for receiving and engaging a bight or loop in a flexible member, such as a rope or cable, such tie down bracket including a base plate having secured thereto a spring mounting body. The spring mounting body includes a projecting finger which cooperates with a spring mounted on the body. The spring defines with the base plate an opening adjacent the finger for receiving and retaining the bight or loop of the flexible member.

4 Claims, 6 Drawing Figures

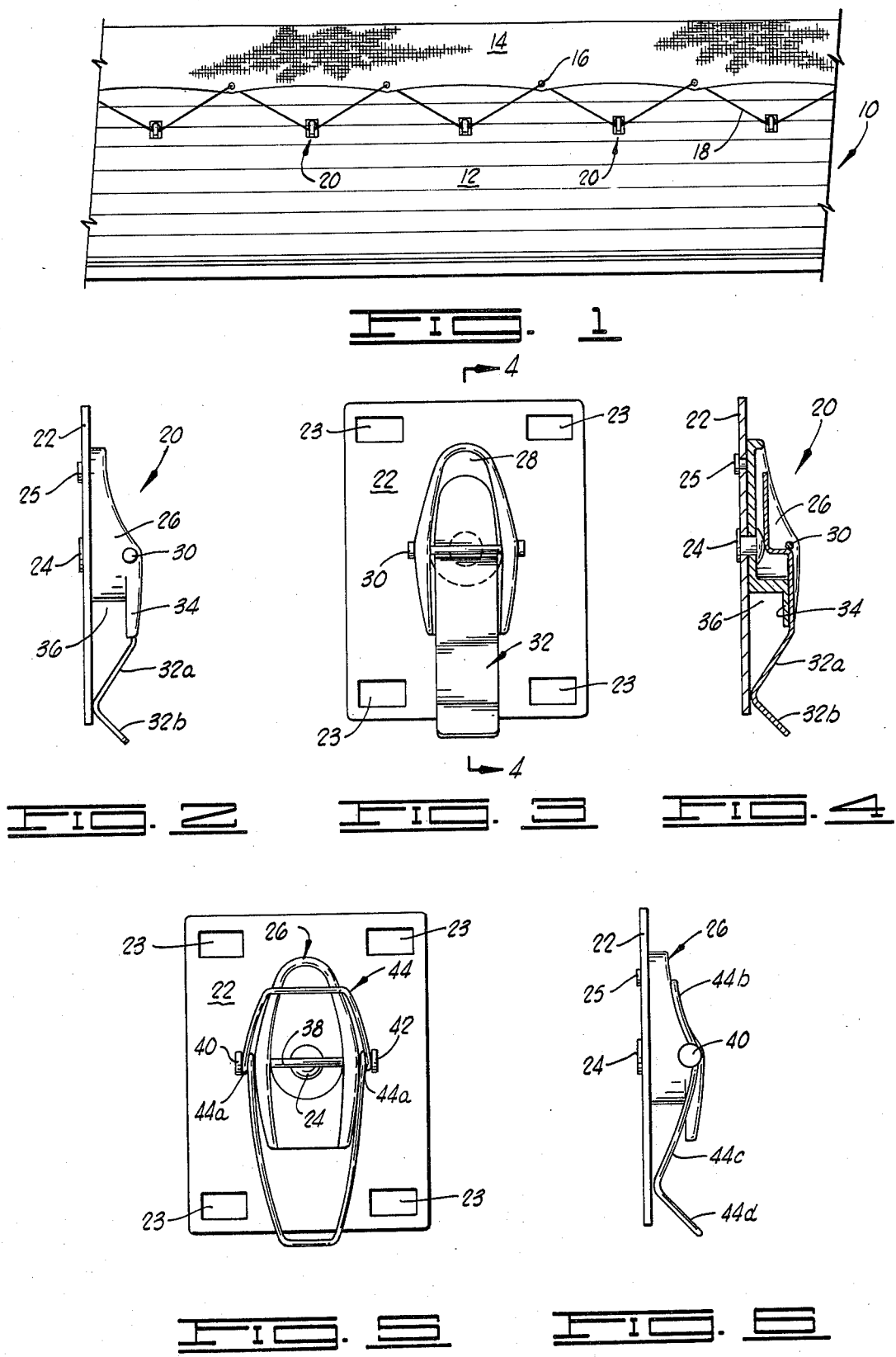

TIE DOWN BRACKETS FOR SECURING BIGHTS OF FLEXIBLE MEMBERS

BACKGROUND OF THE INVENTION

1. Field of the Invention

This invention relates to brackets or clips used to easily receive and tenaciously retain a loop or bight portion of a cord, rope, cable or other flexible member. More particularly, the invention relates to brackets particularly adapted for mounting on the sides of trucks or similar vehicles for retaining the ropes or lines used to secure a tarpaulin over the top of the cargo-carrying portion of such vehicles.

2. Brief Description of the Prior Art

In the transport of cargo in large, open-topped trucks and similar vehicles, it is customary practice to cover the cargo with a removable tarpaulin or similar flexible covering structure. The side edges of the tarpaulin are secured in position after covering the cargo by extending ropes or similar flexible lines from certain points along the side edges of the tarpaulin to a plurality of positions of anchorage along the side walls of the truck. For purposes of anchoring or securing the ropes, it has been conventional practice to provide a cleat or similar rigid structure having projecting fingers or toes beneath which the bights or loops of the rope are passed prior to tensioning. A difficulty frequently encountered with this type of securing or anchoring means is that the rope employed for securing the tarpaulin often develops slack or looseness after an extended period of road travel with characteristic vibration, and the loops, by reason of sagging of the rope, pass free of the anchoring cleats or similar structure, and thus no anchoring function continues to be rendered by these devices.

In other types of anchoring structures or brackets employed for securing the bight portions of ropes, a latching mechanism is sometimes employed which is complicated to operate, and requires digital manipulation in order to open the bracket to receive the bight of the rope or the flexible member, followed by further digital manipulation to lock the backet in place around or over the bight of the rope. In a few instances, the brackets used employ rigid eyes through which the rope must first be threaded in order to place the bight in position in the eye, thus necessitating a free end of the rope which can be manipulated to effect initial threading of the rope through the eye. Where such free end is not available and only the bight is accessible, such devices have no utility, since there is no way to place the bight within the rigid eye.

BRIEF DESCRIPTION OF THE PRESENT INVENTION

The present invention provides an improved tie down bracket for quickly and easily receiving the bight portions or loops formed in ropes which are to be drawn taut from an anchor point established at the point of the bracket. The brackets of the invention are simple in construction, but are reliable in use, and can be employed by unskilled personnel having ordinary digital facility.

Broadly described, the tie down bracket of the invention comprises a base plate adapted for securement to a supporting surface, and having mounted thereon a solid spring mounting or supporting body. The spring supporting body includes a projecting retaining finger which is spaced from the base plate. Spring means is mounted on the spring supporting body and includes a projecting portion which extends from a point adjacent the end of the finger to a point in juxtaposition to the base plate, and then is angulated at that point to provide a projecting guide toe which is inclined away from the base plate. In some types of mounting of the bracket, it is possible to eliminate the base plate from the structure.

In the use of the tie down brackets of the invention, a bight or loop portion of a flexible member, such as a rope, is guided beneath that portion of the spring means most nearly adjacent the base plate by initial contact with the toe portion of the spring means inclined away from the base plate. As a result of the resiliency of the spring means, the bight can be snapped into the space defined between the finger and the base plate. The flexible member is retained in this position by the confining physical limitation to movement constituted by the spring means and thus cannot be released from the tie down bracket at such time as slackness may develop in the flexible member.

An important object of the invention is to provide a tie down bracket which is relatively simple in construction, includes few principle parts and which is mechanically sturdy and therefore characterized in having a long and trouble-free operating life.

A further object of the invention is to provide a tie down bracket capable of functioning as an anchoring device for securing the loop or bight portion of an elongated flexible member, such as a rope, and to retain such loop or bight portion in a fixed location, even though the rope is slackened and relieved from a status of tension.

An additional object of the invention is to provide a tie down bracket which is simply constructed so that inexperienced personnel having no more than average perception and mechanical ability can use the bracket without experiencing difficulty, and without failing to understand how the flexible member is to be secured by means of the bracket.

Additional objects and advantages will become apparent as the following detailed description of certain preferred embodiments of the invention is read in conjunction with the accompanying drawings which illustrate the invention.

BRIEF DESCRIPTION OF THE DRAWINGS

FIG. 1 is a side elevation view showing a portion of an open-topped, cargo-carrying truck, and illustrating a tarpaulin being positioned over the open top of the truck bed and secured in this position by means of a rope which is anchored or tied down by means of the tie down brackets of the present invention.

FIG. 2 is a side elevation view illustrating a tie down bracket constructed according to one embodiment of the present invention as such bracket appears when viewed from the side thereof.

FIG. 3 is a front elevation view of the tie down bracket shown in FIG. 2.

FIG. 4 is a sectional view taken along line 4—4 of FIG. 3.

FIG. 5 is a front elevation view of a tie down bracket constituting an alternate embodiment of the present invention.

FIG. 6 is a side elevation view of the tie down bracket illustrated in FIG. 5.

DETAILED DESCRIPTION OF PREFERRED EMBODIMENTS OF THE INVENTION

Referring initially to FIG. 1 of the drawings, shown therein is a portion of a truck bed designated generally by reference numeral 10 and including side boards 12 forming the side of the bed. A type of truck of which a portion is illustrated in FIG. 1 is an open-topped truck adapted to carry cargo protected by a tarpaulin or similar protective member, and such tarpaulin is designated by reference numeral 14. As is conventional construction, the tarpaulin is provided with plurality of grommet lined eyes or apertures 16 for the purpose of receiving an elongated flexible member, such as a rope 18, which is extended along the side edge of the tarpaulin. The rope 18 is anchored and maintained in tension by providing a series of loops or bights between the grommetted eyes 16 and spaced below the side edge of the tarp, with these loops or bights being engaged by some type of anchoring structure or bracket.

In FIG. 1 of the drawings, the tie down brackets of the present invention are illustrated as in use for engaging and anchoring the bights of the rope 18 and are designated generally by reference numeral 20. The details of structure of one embodiment of the tie down bracket 20 of the invention are illustrated in FIGS. 2–4. As here shown, the tie down bracket 20 preferably includes a base plate 22 which is apertured to allow bolts, screws or other fastening devices to be extended therethrough. The base plate 22 has mounted thereon by means of a first rivet 24 or other suitable fastening device, and also a second rivet 25 or bolt 25 or bolt, a spring supporting body 26. The spring supporting body 26 in the embodiment of the invention illustrated in FIGS. 2–4 includes a dished-out central portion 28 which is arcuately shaped to provide an exposed surface curving outwardly from the base plate 22 toward a central portion of the body, which central portion is the thickest portion of the body. The spring supporting body 26 has a flat back surface 29 which abuts the base plate 22. At the central portion of the body 26, a retainer pin 30 is extended through opposed portions of the body defining the dished-out central portion 28, and this pin 30 retains an elongated, flat metallic spring plate 32. The body 26 further includes a projecting retainer finger 34 which projects substantially horizontally to the base plate 22 and to the flat back surface 29 and defines with the base plate an opening 36. The spring plate 32 includes a projecting portion 32a which extends from the retainer finger 34 into contact with the base plate 22, and is then angulated at that point to provide a projecting guide toe 32b. The shape of the spring plate 32 throughout its length is best illustrated in FIG. 4 of the drawings. Here it will be noted that the spring plate includes an S-shaped portion which includes two right angle bends, one of which bears against the retainer pin 30, and the other of which bears against the upper side of the rivet 24.

In utilizing the tie down bracket 20 of the invention, the bight of a rope or other flexible member is first passed over the free end of the projecting guide toe 32b forming a portion of the spring plate 32. The rope is then pulled so as to force the bight beneath the angulation located at the point where the spring plate 32 contact the base plate 22. The rope is tensioned so that the bight portion is drawn into the opening 36 between the retaining finger 34 of the spring supporting body 26 and the base plate 22. In the use of the tie down brackets 20 for securing the side edges of a tarpaulin 14 over cargo carried in a truck, a series of the tie down brackets are secured in spaced relation along the side of the truck by extending suitable fastening members (not shown) through the openings or apertures 23 formed in the base plate 22. A series of bights formed in the rope or flexible member between the grommeted eyes 16 of the tarpaulin are then placed in anchored or secured position in the openings 36 formed beneath the retaining fingers 34 of each of the tie down brackets 20, and the rope is then tensioned by pulling on one end of it to draw the tarp down tightly to the status illustrated in FIG. 1.

It should also be pointed out that in some occasional uses, the base plate 22 can be eliminated and the spring supporting body riveted or otherwise fastened to the side of a truck or other flat supporting surface.

A different embodiment of the tie down bracket 20 of the invention is depicted in FIGS. 5 and 6. The base plate employed is substantially the same as that previously identified, and is therefore indicated by reference numeral 22. The spring supporting body 26 is also substantially the same as that previously described and is secured by means of the rivets 24 and 25. In the bracket embodiment of FIGS. 5 and 6, however, a retainer pin 38 projects a substantial distance beyond the opposite sides of the spring supporting body 26, and carries at its opposite ends, a pair of enlarged heads 40 and 42. This modified retainer pin 38 is formed in this fashion to facilitate the engagement therewith of a spring member 44 having the configuration depicted in FIGS. 5 and 6. Thus, the spring member includes pairs of convolutions 44a wrapped around the shaft of the retaining pin 38 adjacent the heads 40 and 42 and outside the spring supporting body 26. On opposite sides of the convolutions 44a, the spring member 44 includes a load bearing portion 44b which bears against the tapered portion of the spring supporting body 26, and a projecting portion 44c which projects into contact with the base plate 22. The spring member 44 also includes a projecting guide toe 44d which extends outwardly at an angle from the base plate 22.

The tie down bracket embodiment illustrated in FIGS. 5 and 6 is operated, and functions, in substantially the same manner as has been described as characteristic of the embodiment of the invention depicted in FIGS. 2–4.

Although certain preferred embodiments of the invention have been herein described in order to illustrate the basic principles upon which the invention is based, it will be understood that some variations and changes in the actual and specific structures illustrated and described in referring to such specific embodiments may be effected without departure from these basic principles. Changes and innovations of this type are therefore deemed to be circumscribed by the spirit and scope of the invention, except as the same may be necessarily limited by the appended claims or reasonable equivalents thereof.

What is claimed is:

1. A tie down bracket for engaging a bight in a flexible member comprising:
   a base plate;
   a spring supporting body secured to said base plate and including a retainer finger spaced from and defining an opening with the base plate;

a retainer pin extending through said body and projecting from opposite sides thereof; and spring means mounted on said body and including a projecting portion which extends from the body across said opening into contact with the base plate, said projecting portion having a guide toe extending out from said plate at an acute angle to guide the bight of the flexible member between said spring means and the plate and into said opening, said spring means comprising a wire having convolutions formed therein and engaging the surrounding end portions of said retainer pin, said wire including a web portion joined to said projecting portion and extending across the upper side of said spring supporting body.

2. A tie down bracket as defined in claim 1 wherein said retainer finger extends substantially parallel to said plate as a cantilever with respect to the remaining portion of said body.

3. A tie down bracket for engaging a bight in a flexible member comprising:
   a base plate;
   a spring supporting body secured to said base plate and including a retainer finger spaced from, and defining an opening with, the base plate; and
   a retainer pin extending through the spring supporting body and projecting on opposite sides thereof; and
   a wire having convolutions formed therein engagingly surrounding end portions of said retainer pin, and having:
      a load bearing portion extending across the spring supporting body on the opposite side thereof from said retainer finger;
      a projecting portion joined to said load bearing portion and extending on opposite sides of said retainer finger in contact therewith; and
      a generally U-shaped guide toe connected to the portions of said wire which extend on opposite sides of said retainer finger, and forming an angle therewith at a point where said wire extends to and contacts said base plate.

4. A tie down bracket for engaging a bight in a flexible member comprising:
   a base plate;
   a spring supporting body secured to said base plate and including:
      a flat back surface bearing flatly against said base plate;
      a dished-out central portion on the side of the body opposite said flat back surface formes in part by side walls;
      a retainer finger projecting from said central portion as a cantilever, and spaced from, and extending substantially parallel to the planes of said flat back surface and said base plate, said finger defining with said base plate an opening to the space between the finger and base plate;
      a retainer pin extending through said side walls and across said dished-out central portion;
   spring means mounted on said body and including:
      a load bearing portion bearing against said body;
      an intermediate portion of said spring means being positioned underneath said retainer pin so that said spring means is retained on said body by said retainer pin;
      a projecting portion extending from the body across said opening into contact with the base plate, said projecting portion having a guide toe extending out from said base plate at an acute angle to guide the bight of a flexible member between said spring means and the base plate and into said space; and
      a portion between said projecting portion and said load bearing portion cooperating with the retainer finger of said spring supporting body to prevent lateral movement of said spring means transversely of said retainer finger.

* * * * *